United States Patent [19]
Lenk

[11] Patent Number: 6,098,156
[45] Date of Patent: Aug. 1, 2000

[54] METHOD AND SYSTEM FOR RAPID LINE OWNERSHIP TRANSFER FOR MULTIPROCESSOR UPDATES

[75] Inventor: Peter Steven Lenk, Austin, Tex.

[73] Assignee: International Business Machines Corporation, Armonk, N.Y.

[21] Appl. No.: 08/898,323

[22] Filed: Jul. 22, 1997

[51] Int. Cl.[7] .................................................. G06F 12/08
[52] U.S. Cl. .................. 711/146; 711/121; 711/143; 711/144; 711/145; 711/156
[58] Field of Search .................................... 711/143, 144, 711/145, 146, 121, 156

[56] References Cited

U.S. PATENT DOCUMENTS

| | | | |
|---|---|---|---|
| 5,136,691 | 8/1992 | Baror | 395/200 |
| 5,185,878 | 2/1993 | Baror et al. | 395/425 |
| 5,197,146 | 3/1993 | LaFetra | 395/425 |
| 5,226,144 | 7/1993 | Moriwaki et al. | 395/425 |
| 5,297,269 | 3/1994 | Donaldson | 711/145 |
| 5,353,423 | 10/1994 | Hamid et al. | 395/425 |
| 5,490,279 | 2/1996 | Golbert et al. | 395/800 |
| 5,522,057 | 5/1996 | Lichy | 395/471 |
| 5,535,361 | 7/1996 | Hirata et al. | 711/145 |
| 5,706,464 | 1/1998 | Moore et al. | 711/122 |
| 5,715,428 | 2/1998 | Wang et al. | 711/141 |

Primary Examiner—Do Hyun Yoo
Assistant Examiner—Hiep T. Nguyen
Attorney, Agent, or Firm—Sawyer Law Group LLP; Anthony V. S. England

[57] ABSTRACT

A method and system according to the present invention of accessing data in a multiprocessor system including a plurality of processors and a memory, wherein the memory includes a plurality of memory locations, and wherein at least a first processor and a second processor each include a reservation indicator and a cache, each cache having a plurality of cache memory locations corresponding to the memory locations. The method and system comprises providing a Load And Reserve request from the first processor for at least one of the plurality of memory locations and determining whether the second processor includes at least one of the plurality of cache memory locations corresponding with the at least one of the memory locations; determining whether the second processor's reservation indicator is set, this determination being in response the second processor including the at least one of the cache memory locations corresponding with the at least one of the memory locations. The method and system also provides a state indicating that the at least one of the cache memory locations of the second processor corresponding to the at least one of the memory locations is invalid, responsive to the reservation indicator not being set.

25 Claims, 9 Drawing Sheets

M=Modified  E=Exclusive  S=Shared  I=Invalid

M=Modified   E=Exclusive   S=Shared   I=Invalid

METHOD AND SYSTEM FOR RAPID LINE OWNERSHIP TRANSFER FOR MULTIPROCESSOR UPDATES

FIELD OF THE INVENTION

The present invention relates generally to a multiprocessor system and more particularly to a system and method for rapid line ownership transfer for multiprocessor updates.

BACKGROUND OF THE INVENTION

In a typical multiprocessor system, several processors share at least one memory which they can access via a system bus. Since each processor has access to the shared memory, it is important to maintain cache coherence to ensure that the processor will access updated data and also to ensure that only one processor will write in a single location of the memory at any given time.

Most multiprocessing architectures, such as the PowerPC architecture, have added operations which permit interprocess synchronization. ("PowerPC" is a trademark of IBM Corporation.) One common requirement of such synchronization is the ability to atomically update one or more locations in system memory. The rapid execution of such atomic operations is considered crucial to the performance of shared memory multiprocessors. The operational primitives used for this purpose in multiprocessor systems, such as the PowerPC™, are the Load And Reserve and the Store Conditional instructions. For more background information regarding the PowerPC architecture, refer to the PowerPC Architecture Specification for details of the proper use of these instructions.

In order to maintain cache coherence in the multiprocessor systems, MESI protocol is typically used. MESI represents the four states which tell the processors the status of the memory access request. These states are "modified," "exclusive," "shared," and "invalid." "Modified" implies that the data has been modified by another processor. "Exclusive" implies that the requesting processor can immediately modify the requested data. "Shared" implies that other cache lines in other processors need to be erased prior to the requesting processor being able to modify data. "Invalid" implies that a processor does not have data in the requested cache line.

The use of the MESI state typically ensures that only one processor in the multiprocessor system will gain the right to store data into a cache line at any given time, thus multiple processors will not be able to try to store data in the same location at the same time in the shared memory. As a precaution, the "shared" state is typically the initial state sent to the requesting processor for a read request if the cache line also exists unmodified in another processor's cache. The "shared" state assures that no modification is made until the other processors have had a chance to erase their cache line corresponding to the requested cache line, assuming there is another processor which has a cache line corresponding to the requested cache line.

Some memory access requests require that the requesting processor have a requested cache line in an "exclusive" state. In such a case, having the "shared" state instead of the "exclusive" state requires that the requesting processor send a second request to obtain the "exclusive" state. The second request requires additional time, which translates into a direct loss in performance. Accordingly, what is needed is a system and method for improving the performance of a multiprocessor system by decreasing the wait time required to complete certain requests. In particular, a system and method is needed to improve performance for interprocessor synchronization operations in multiprocessors using the MESI coherence protocol. The present invention addresses such a need.

SUMMARY OF THE INVENTION

A method and system according to the present invention of accessing data in a multiprocessor system including a plurality of processors and a memory, wherein the memory includes a plurality of memory locations, and wherein at least a first processor and a second processor each include a reservation indicator and a cache, each cache having a plurality of cache memory locations corresponding to the memory locations. The method and system comprises providing a Load And Reserve request from the first processor for at least one of the plurality of memory locations and determining whether the second processor includes at least one of the plurality of cache memory locations corresponding with the at least one of the memory locations; determining whether the second processor's reservation indicator is set, this determination being in response to the second processor including the at least one of the cache memory locations corresponding with the at least one of the memory locations. The method and system also provides a state indicating that the at least one of the cache memory locations of the second processor corresponding to the at least one of the memory locations is invalid, this step being in response to the second processor's reservation indicator not being set.

DESCRIPTION OF THE INVENTION

The present invention relates to a system and method for rapid line ownership transfer for multiprocessor updates. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
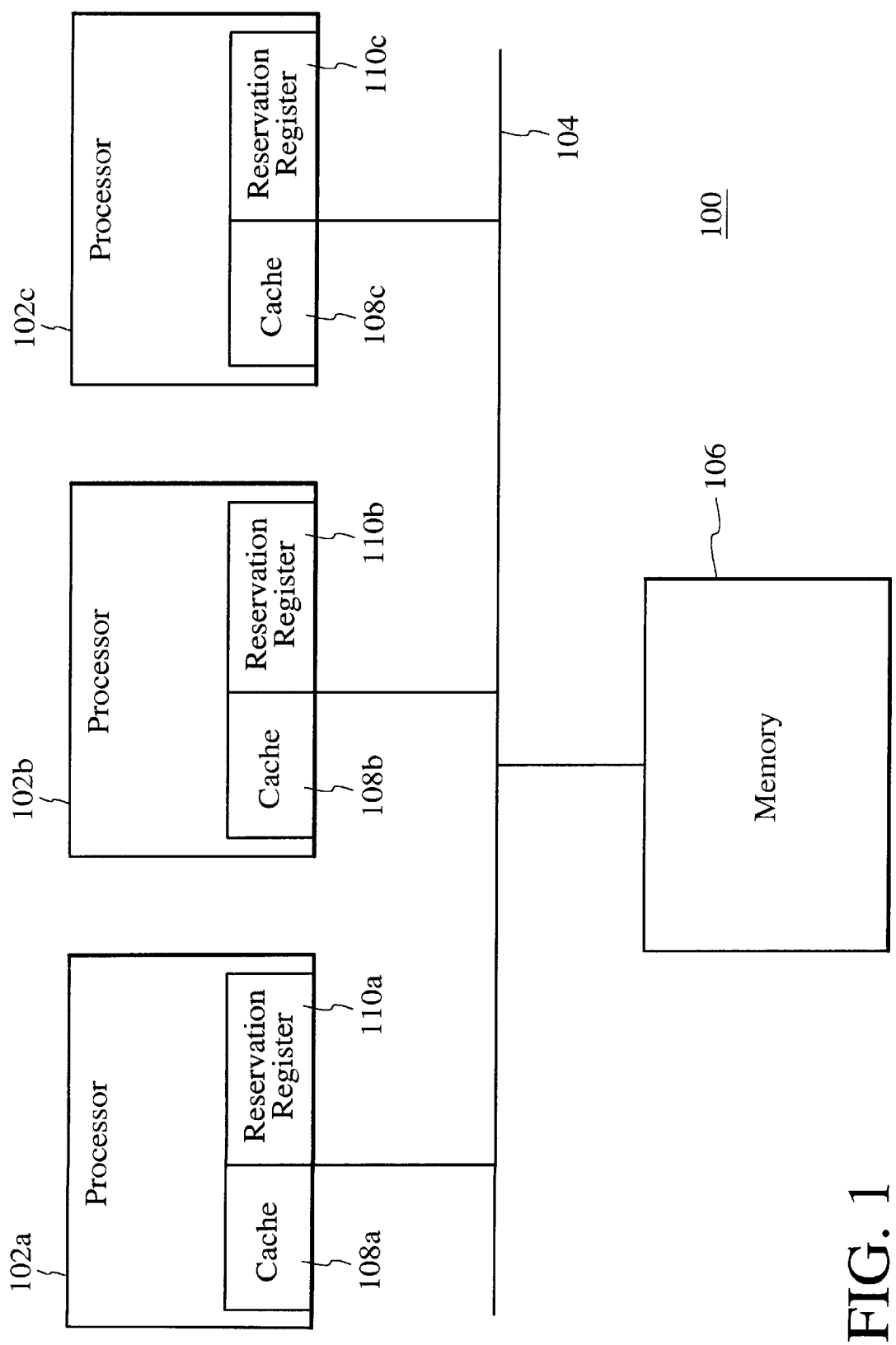
FIG. 1 is a block diagram of a multiprocessor system in which the present invention resides.

FIG. 1 is a block diagram of a multiprocessor system in which the present system resides. The system 100 is shown to include a plurality of processors 102a–102c. These processors 102a–102c are connected to the system memory 106 via a system bus 104. Additionally, each processor is shown to have its own cache 108a–108c and a reservation register 110a–110c.

Typically, in a conventional system, if one of the processors, such as processor 102a, issues a Load And Reserve instruction, then the request is sent on the bus 104 and the other processors 102b–102c reviews the request, and the requesting processor receives a status of "shared". The Load And Reserve instruction is normally followed shortly by a Store Conditional instruction which needs the "exclusive" or the "modified" state in order to complete for purposes of this example. Having the "shared" state instead of the "exclusive" state requires that the storing processor send a second request to obtain the "exclusive" state so that it may complete for purposes of this example its store instruction. By observing this second request, the other processors will determine that they need to invalidate the requested cache line in their own cache, and the requesting processor can then receive "exclusive" status. The requesting processor can thereafter complete for purposes of this example the Store Conditional instruction. This loss of time translates into a direct loss in performance.

Figure 2:
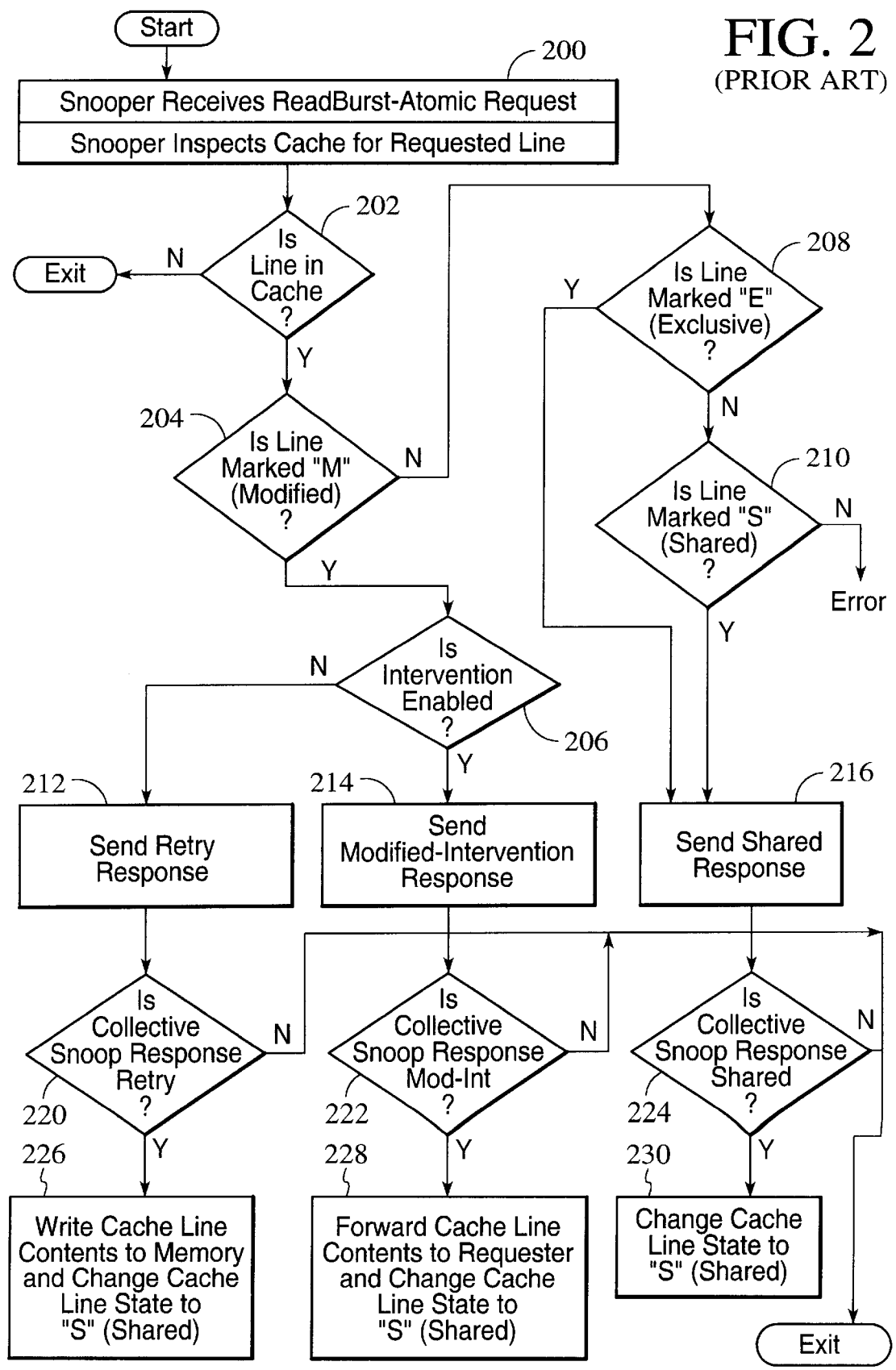
FIG. 2 is a flow diagram of a conventional method of line ownership transfer for multiprocessor updates.

FIG. 2 is a flow diagram of a conventional method for line ownership transfer for multiple processor updates. Assuming processor 102a is the requesting processor of FIG. 1, then the remaining processors 102b–102c are generally referred to as the snooping processors, or the snoopers. When the requesting processor requests execution of a Load And Reserve instruction, and the requested information is not in the requestor's cache, then the requesting processor makes a second request. The second request is broadcast on the system bus and is referred to as a Readburst-Atomic request. Thus, when a requesting processor requests a Load And Reserve which misses in the requestor's local cache, then the snooping processors receive the Readburst-Atomic request via step 200. In response, the snooping processors inspect their own cache(s) for the requested line via step 200. It is then determined if the requested line is in the cache of a snooping processor via step 202. If not, then the snooping processor's determination is complete for purposes of this example. If, however, the requested line is located in the cache of a snooping processor, then it is determined if the cache line is marked "modified" via step 204. If it is, then it is determined if intervention is enabled via step 206. The enablement of intervention allows a snooping processor to either stop or provide the requested data from the snooping processor itself.

If intervention is not enabled, then a retry response is sent to the requesting processor via step 212. Thereafter, it is determined whether the collective snooping processor response is "retry" via step 220. A collective snooping processor response is typically determined by collecting all of the responses of the various snooping processors and prioritizing the various responses and concluding with a collective snooping processor response. If the collective snooper response is not "retry", then the snooping processors' evaluation is complete for purposes of this example. If, however, the collective snooping processor response is "retry", then the snooping processor's cache line contents are written into memory and its cache line state is changed to "shared" via step 226.

If intervention is enabled via step 206, then a "modified-intervention" response is sent via step 214. It is then determined if the collective snooping processor response is "modified-intervention" via step 222. If not, then the snooping processor's evaluation is complete for purposes of this example. If, however, the collective snooping processor response is "modified-intervention", then the contents of the snooping processor's cache line is forwarded to the requesting processor and its cache line state is then changed to "shared" via step 228.

If the cache line of the snooping processor is not marked "modified" via step 204, then it is determined if the cache line state is marked "exclusive" or "shared" via steps 208 and 210. If the cache line state is marked "exclusive" or "shared", then a "shared" response is sent via step 216. A "shared" response allows the requesting processor's request to succeed. It is then determined if the collective snooping processor response is "shared" via step 224. If not, then the snooping processor's evaluation is complete for purposes of this example. If, however, the collective snooping processor response is "shared", then the cache line state is changed to "shared" via step 230.

If the cache line state is not marked "exclusive" via step 208, then it is determined if the cache line state is marked "shared" via step 210. If not, then an error has occurred, and the evaluation is complete for purposes of this example.

Figure 3:
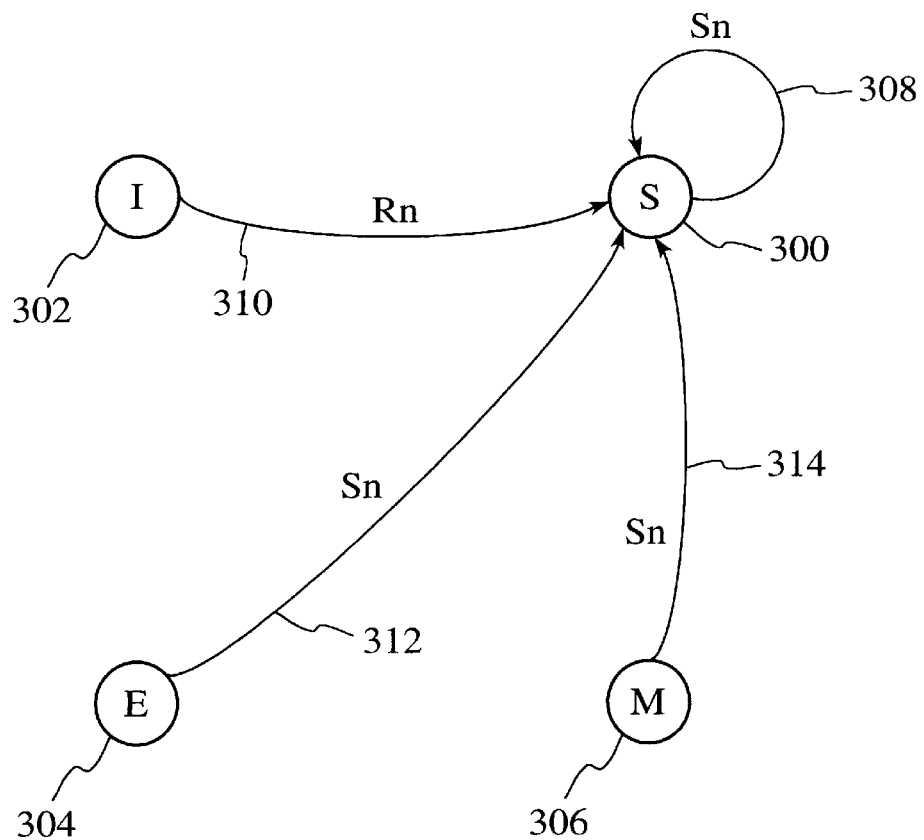
FIG. 3 is a state diagram of the conventional method of line ownership transfer for multiprocessor updates shown in FIG. 2.

FIG. 3 is a state diagram of the conventional method shown in FIG. 2. As previously mentioned, the MESI states shown in the state diagram respectively stands for Modified, Exclusive, Shared, and Invalid states. The Rn implies read-normal for the requesting processor, while Sn implies Normal state of the snooping processors. Assuming that the requesting processor's state is "invalid", implying that the requested data is not in the requesting processor's cache, then the state would typically move from "invalid" to "shared". If the state of a snooping processor is "exclusive" 304, then the state would typically move to "shared" 300. Likewise, if the state of a snooping processor was "modified" 306, then the state would typically move to "shared" 300. Also, if the snooping processor's state was initially "shared" 300, then it would remain "shared". Note that the state of every processor, both the requesting processor and the snooping processors, eventually ends up "shared" in the typical method for line ownership transfer for multiprocessor updates.

PowerPC processors, which reside on a system bus, may conform to a protocol, such as memory coherent protocol which treats any cacheable, coherent, readburst request from another processor in a common manner. That is, if a snooping processor finds a requested memory line in its cache, it responds "shared" if the line is marked "shared" or "exclusive". If it finds the line marked "modified", it responds "modified" or "retry" to indicate that it must provide its data copy to the requestor or to memory, respectively. The snooping processor then performs one of the transitions shown as "Sn" in the state diagram shown in FIG. 3. FIG. 3 also shows the requesting processor's associated transition to "shared" marked "Rn". If the line is not held in the snooping processor's cache, it responds "clean", and no state change is made in the snooping processor's cache.

The architected system bus protocol for PowerPC processors also requires that when the Load And Reserve and the Store Conditional instructions miss in the local cache, and a memory access request is sent on the bus in response to the miss, the bus request includes a flag indicating an association with the former request. This flag is known as the atomic bit. The atomic bit is intended to support the coherent implementation of higher level (e.g., L3) caches or nonsnooping coherent structures such as tag directories.

The present invention provides rapid line ownership transfer for multiprocessor updates, and improves performance for interprocessor synchronization operations in multiprocessors using the MESI coherent protocol. The invention takes advantage of a recognition that (1) the purpose of the Load And Reserve/Store Conditional combination is to obtain data, then modify that data and update memory without allowing another processor to modify the location in the interim, and (2) since the Load And Reserve is normally followed by a Store Conditional, and a Readburst-Atomic request may be in response to a Load And Reserve which missed in the local cache, the issuance of a Readburst-Atomic bus request provides the rest of the system with a strong hint that the request also implies a near-term intent to modify. That is, although sometimes the "shared" state is necessary, it is often not necessary. Sending a "shared" state for every Load And Reserve request by a requesting processor costs time which translates into a direct loss in performance.

A Readburst-Atomic request indicates to a snooping processor that a requesting processor is attempting to obtain the cache line for a Load And Reserve. According to a prior method and apparatus which does not have all the advantages of the present embodiment, the snooping processor's "shared" response and its line transition from "exclusive" to "shared" is typically wasted effort, as it will almost always be followed soon by what is referred to as a Dclaim bus request to purge the same line from the snooping processor's cache. For the same reason, according to the prior method and apparatus, a "modified" (or "retry") response with the line's subsequent transition from "modified" to "shared" is also typically wasted effort.

The method and apparatus of the present embodiment take advantage of a recognition that (1) if the requesting processor has the line marked "exclusive" or "modified" when it executes a Store Conditional, the atomic operation will complete quickly, and that (2) by removing the line from the snooping processor's cache, the exclusive right to modify can be immediately acquired by the requesting processor without later having to issue a bus Dclaim for the Store Conditional. Note that, according to the present embodiment, if the snooping processor already has a reservation on the snoop line (i.e., it has performed its own Load And Reserve and a multiprocessor race is underway), behavior reverts to that described by the normal state transitions shown in FIG. 3.

In accordance with the present embodiment, when a request which includes some indication that it is related to an atomic operation, such as a Readburst-Atomic request, is detected on the bus, and a snooping processor holds the requested line in its cache, but does not have a reservation set on that line, it will respond as it would have if the request had been what is referred to as a "Read With Intent To Modify" (RWITM), that is, the response will include the following: "modified" for cache line marked "modified" with bus intervention enabled; "retry" for cache line marked "modified" with bus intervention disabled; "clean" for cache line marked "invalid," "exclusive" or "shared."

Figure 4:
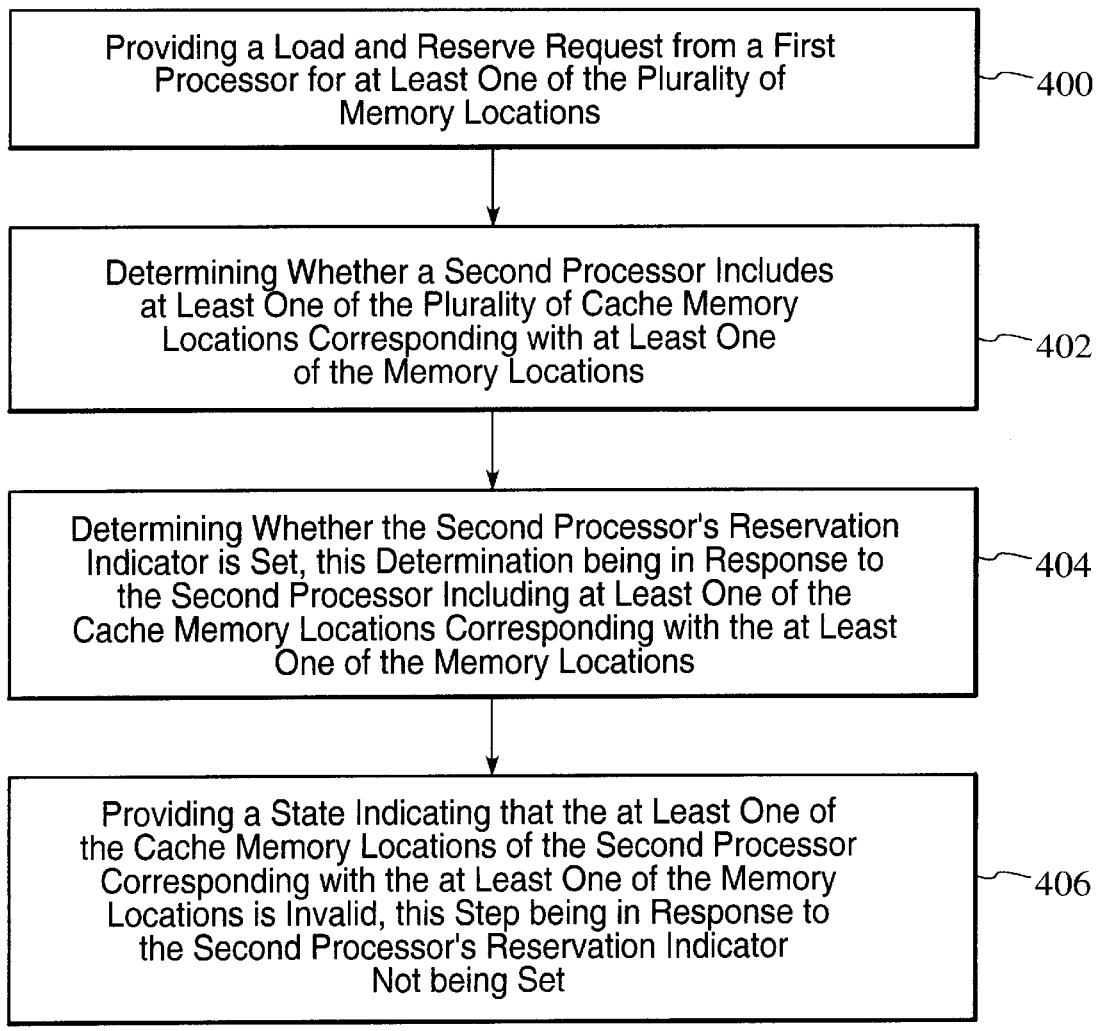
FIG. 4 is a flow diagram of a method according to the present invention for rapid line ownership transfer for multiprocessor updates.

FIG. 4 is a flow diagram of a method according to the present invention. A Load And Reserve request is provided from a first processor for at least one of a plurality of memory locations via step 400. It is then determined whether a second processor includes at least one of a plurality of cache memory locations corresponding with the at least one of the memory locations via step 402. It is also determined whether the second processor's reservation indicator is set, this determination being in response to the second processor including the at least one of the cache memory locations corresponding with the at least one of the memory locations via step 404. A state indicating that the at least one of the cache memory locations of the second processor corresponding with the at least one of the memory locations is invalid, this step being in response to the second processor's reservation indicator not being set, is provided via step 406.

Figure 5A:
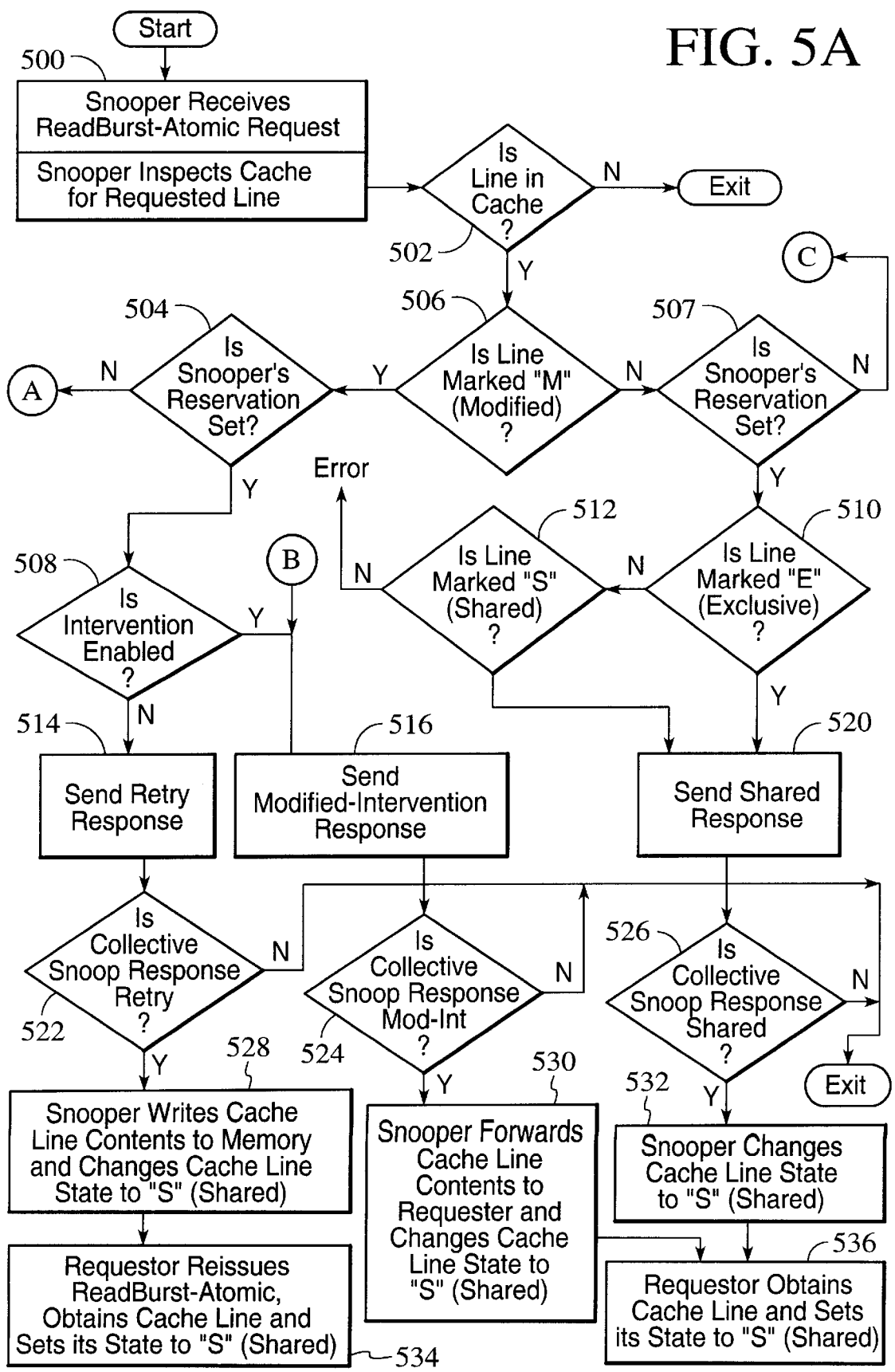
FIGS. 5a–5b are more detailed flow diagrams of the method according to the present invention.
Figure 5B:
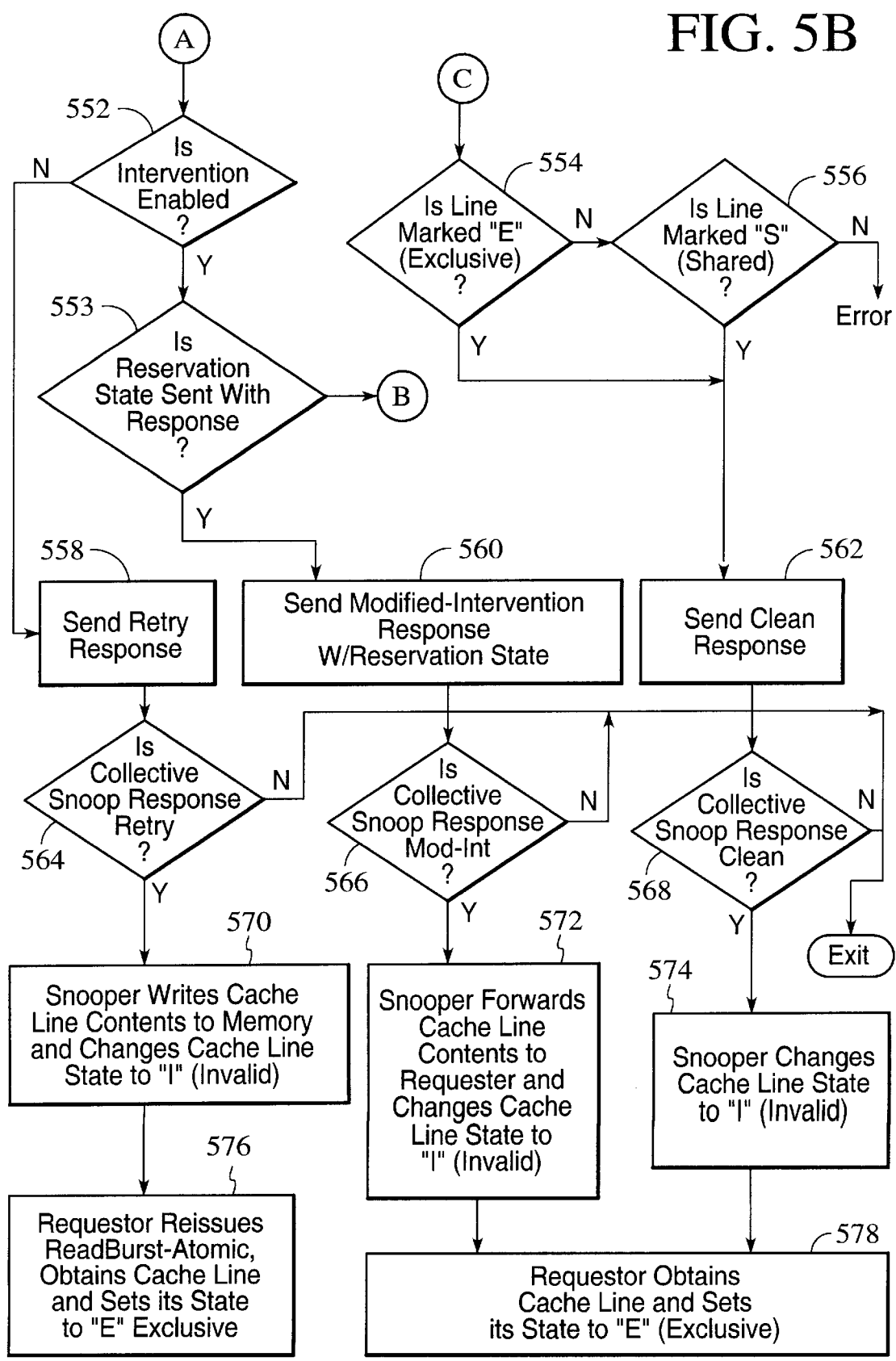

FIGS. 5a and 5b show a more detailed flow diagram of a method according to the present invention. A snooping processor receives a Readburst-Atomic request via step 500. The snooping processor also inspects its own cache for the requested line, via step 500. It is then determined whether the requested line is in the snooping processor's cache via step 502. If not, then the snooping processor's evaluation is complete for purposes of this example. If, however, the requested line is in the snooping processor's cache, then it is determined if the requested line is marked "modified" via step 506. If it is marked "Modified", then it is determined if the snooping processor's reservation is set via step 504. If the snooping processor's reservation is set, then it is determined if intervention is enabled via step 508. If not, then a "retry" response is sent via step 514. It is then determined if a collective snooping processor response is "retry", via step 522. If the collective snooping processor response is not "retry", then the snooping processor evaluation is complete for purposes of this example. If, however, the collective snooping processor response is "retry", then the cache line contents of the snooping processor are written to memory and the snooper's cache line state is changed to "shared", via step 528. The requesting processor then reissues a Readburst-Atomic and obtains the requested cache line and sets its state to "shared" via step 534.

If intervention is enabled via step 508, then a "modified-intervention" response is sent via step 516. It is then determined if the collective snooping processor response is "modified-intervention" via step 524. If not, then the snooping processor's evaluation is complete for purposes of this example. If, however, the collective snooping processors' response is "modified-intervention", then the cache line contents are forwarded to the requesting processor and the snooper's cache line state is changed to "shared" via step 530. The requesting processor then obtains the cache line and sets its state to "shared" via step 536.

If the cache line is not marked "modified" via step 506, then it is determined if the snooping processor's reservation is set via step 507. If the reservation is set, then it is determined if the cache line is marked "exclusive", via step 510. If the cache line is marked "exclusive", then a "shared" response is sent via step 520. It is then determined if the collective snooping processors' response is "shared" via step 526. If not, then the snooping processor's evaluation is complete for purposes of this example. If, however, the collective snooping processor's response is "shared", then the snooper's cache line state is changed to "shared" via step 532. The requesting processor then obtains the cache line and sets its state to "shared" via step 536.

If the cache line is not marked "exclusive" via step 510, then it is determined if the cache line is marked "shared" via step 512. If the cache line is not marked "shared", then an error has occurred. If, however, the cache line is marked "shared" via step 512, then a "shared" response is sent via step 520.

If the snooping processor's reservation is not set via step 504 or step 507, then FIG. 5b needs to be referred. After determining that the snooping processor's reservation is not set via step 504, it is determined if intervention is enabled via step 552. If not, then a "retry" response is sent via step 558. It is then determined if the collective snooping processors' response is "retry" via step 564. If the collective snooping processors' response is not "retry", then the snooping processor's evaluation is complete for purposes of this example. If the collective response is "retry", then the cache line contents are written to memory and the snooper's cache line state is changed to "invalid" via step 570. The requesting processor then reissues a Readburst-Atomic, obtains the cache line, and sets its state to "exclusive" via step 576.

If intervention is enabled via step 552, then it is determined if in the system's implementation the reservation state is sent with response via step 553. If not, then the analysis moves to FIG. 5A at point B. If, however, the reservation state is sent with the response via step 553, then a "modified-intervention" response with reservation state is sent via step 560. It is then determined if the collective snooping processor's response is "modified-intervention" via step 566. If not, then the snooping processor's evaluation is complete for purposes of this example. If, however, the collective response is "modified-intervention" via step 566, then the cache line contents of the snooping processor are forwarded to the requesting processor and the snooper's cache line state is changed to "invalid" via step 572. The requesting processor then obtains the cache line and sets its state to "exclusive" via step 578.

If it is determined that the snooper's reservation is not set via step 507 of FIG. 5A, then it is determined if the cache line is marked "exclusive" via step 554 shown in FIG. 5B. If so, then a "clean" response is sent via step 562. It is then determined if the collective snooping processor's response is "clean" via step 568. If the collective response is not "clean", then the snooping processor's evaluation is complete for purposes of this example. If, however, the collective response is "clean" via step 568, then the snooper's cache line state is changed to "invalid" via step 574. The requesting processor then obtains the cache line and sets its state to "exclusive" via step 578.

If it is determined that the cache line is not marked "exclusive" via step 554, then it is determined if the cache line is marked "shared" via step 556. If the cache line is not marked "shared" via step 556, then an error has occurred. If, however, the cache line is marked "shared" via step 556, then a "clean" response is sent via step 562. Thereafter, it is determined if the collective snooping processor's response is "clean" via step 568. If the collective response is not "clean" via step 568, then the snooping processor's evaluation is complete for purposes of this example. If, however, the collective response is "clean" via step 568, then the snooper's cache line state is changed to "invalid" via step 574. The requesting processor then obtains the cache line and sets its state to "exclusive" via step 578.

Figures 6, 8:
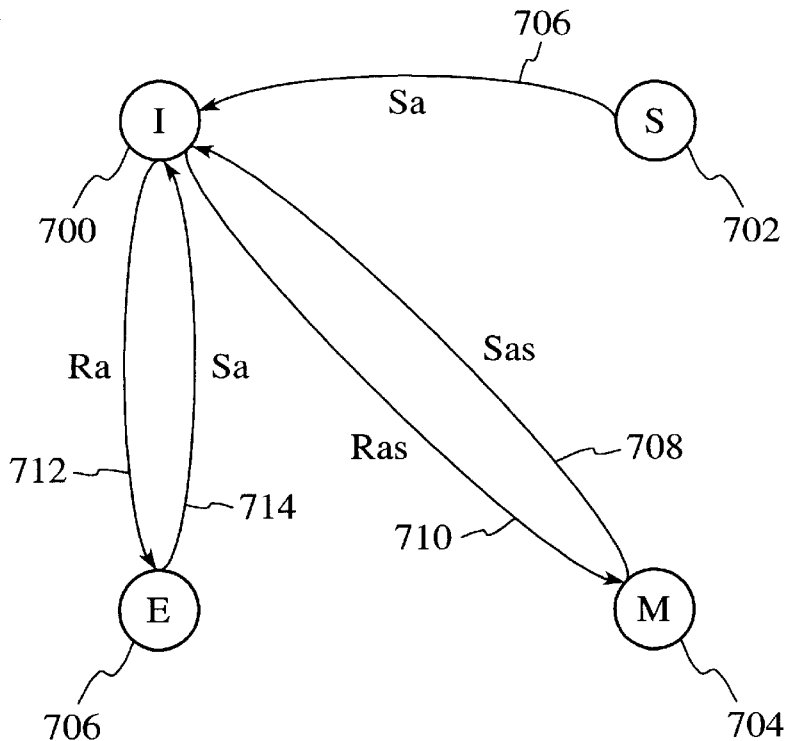
FIG. 6 is a state diagram of a method according to the present invention.
FIG. 8 is a state diagram of the embodiment shown in FIG. 7.

FIG. 6 shows a state diagram of a portion of the method according to the present invention as shown in FIG. 5b. As previously stated, MESI respectively indicates "Modified", "Exclusive", "Shared" and "Invalid". When a Readburst-Atomic request is detected on the bus and the snooping processor holds the cache line in its cache, but does not have a reservation set on that cache line, then the snooping processor performs the transition indicated by "Sa" or "Sas" shown in FIG. 6. The requesting processor obtains the cache line either from the snooping processor or from memory and performs the transitions marked "Ra" or "Ras". Since the requesting processor does not see a "shared" response, it can mark the cache line "exclusive" or "modified" based on the snooping processor's response.

A subset of this approach may be implemented to achieve some performance benefits since not all of the transitions shown in FIG. 6 are necessary to achieve some performance benefits.

Figure 7A:
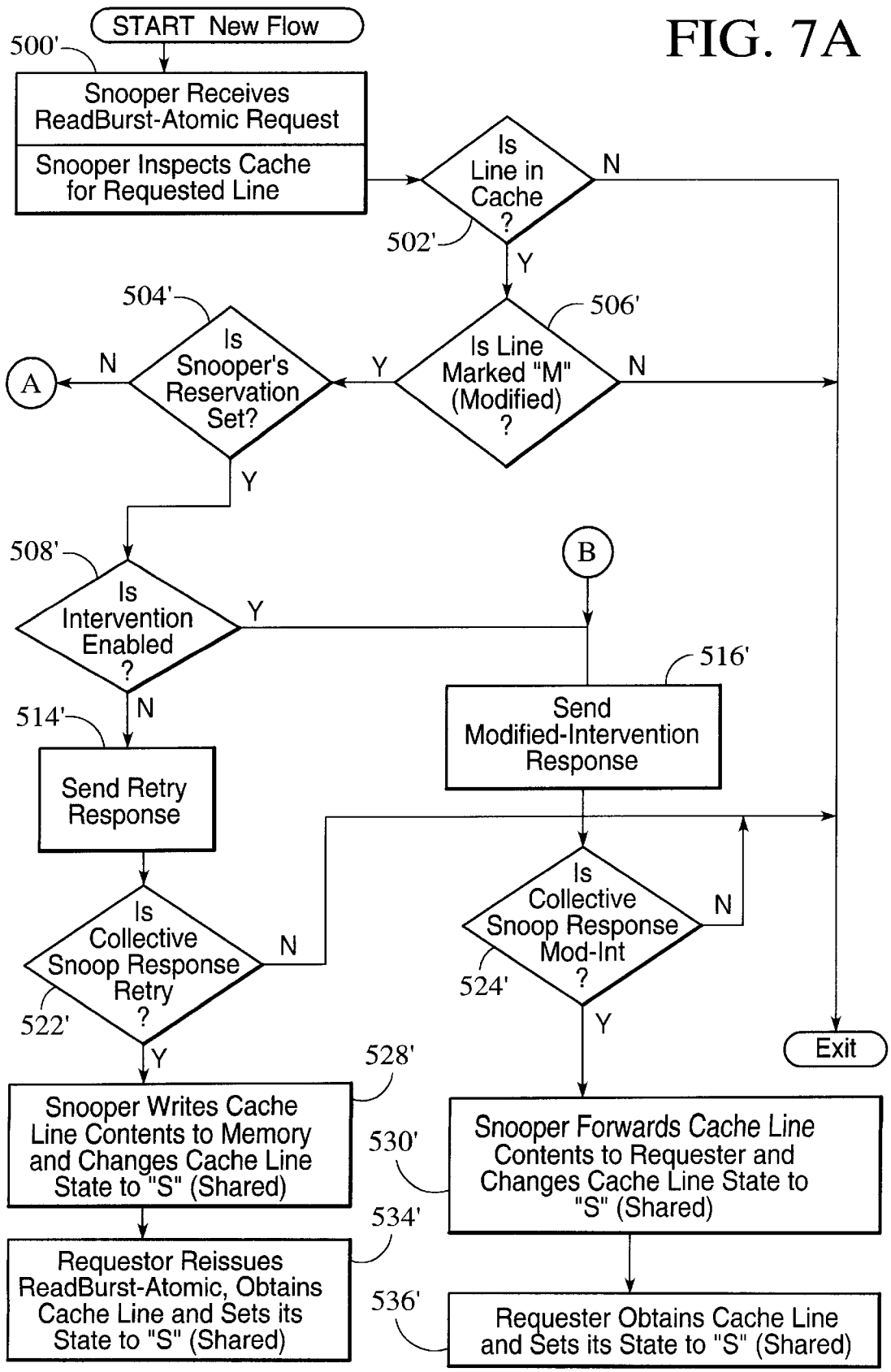
FIGS. 7A–7B are flow diagrams of another embodiment of the present invention.
Figure 7B:
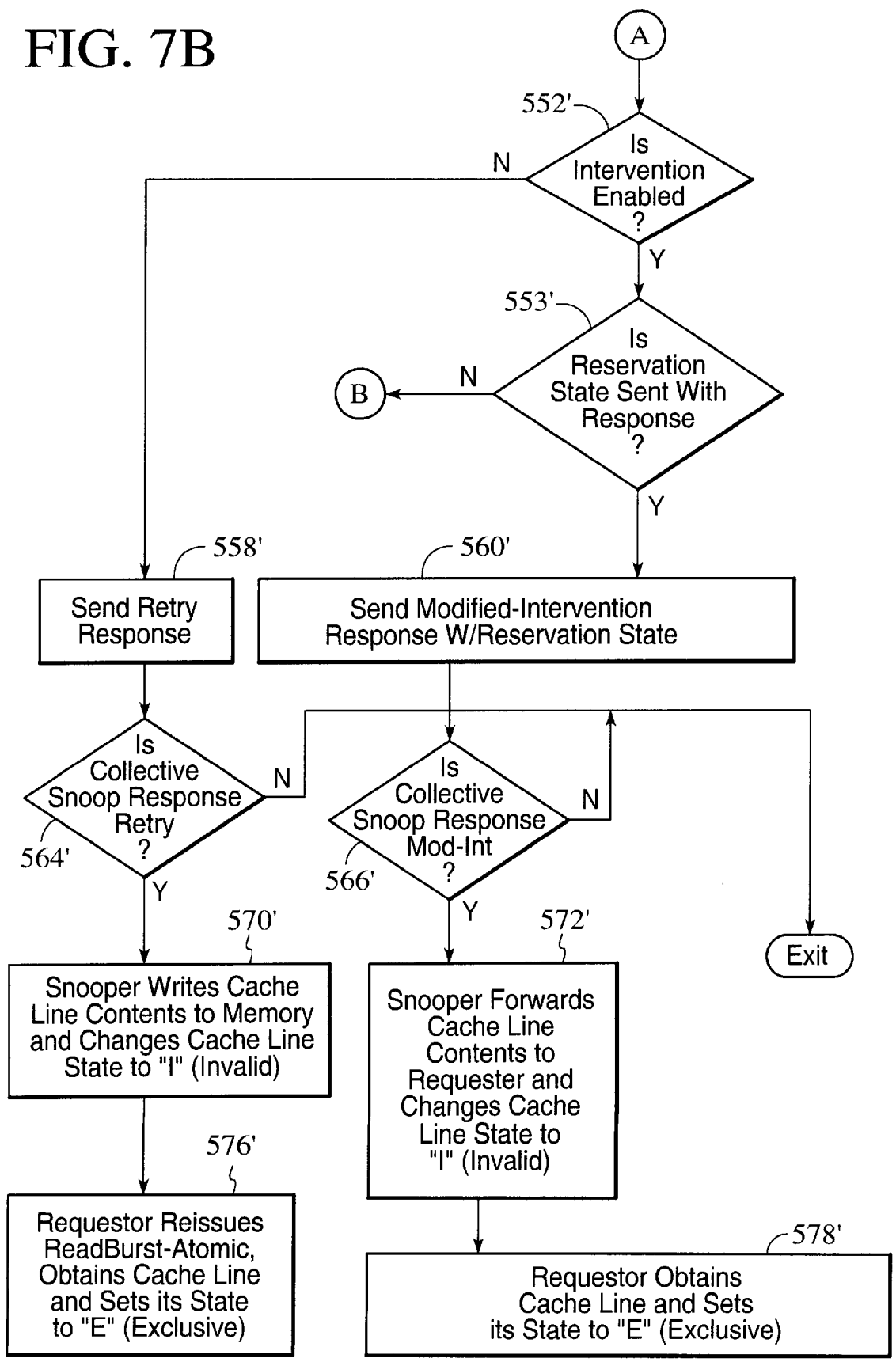

FIGS. 7A–7B are flow diagrams of another embodiment of the present invention. This other embodiment may be considered a subset of the method shown in FIGS. 5A–5B. FIG. 7A is substantially the same as the flow diagram shown in FIG. 5A with the exception that if the requested line is not marked "modified" via step 506, then the snooping processor's evaluation is complete for purposes of this example. Likewise, since the snooping processor's evaluation is complete for purposes of this example if the line is not marked "modified" via step 506, then the portion of the flow diagram of FIG. 5B starting from point C is eliminated.

By treating Readburst-Atomic as similar to a Read With Intent To Modify, the requesting processor can rapidly perform its read, modification, and store without the need to go to the system bus more than once (if at all). In this subset case, the RWITM interpretation is only done if the snooped line is marked "modified". FIG. 8 shows a state diagram for this alternate method.

A method and system for rapid line ownership transfer for multiprocessor updates has been disclosed. Software written according to the present invention is to be stored in some form of computer-readable medium, such as memory or CD ROM, or transmitted over a network, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method of accessing data in a multiprocessor system including a plurality of processors and a memory, wherein the memory includes a plurality of memory locations, and wherein at least a first processor and a second processor each include a reservation indicator and a cache, each cache having a plurality of cache memory locations corresponding to the memory locations, the method comprising the steps of:

(a) providing a Load And Reserve request from the first processor for at least one of the plurality of memory locations;

(b) determining whether the second processor includes at least one of the plurality of cache memory locations corresponding with the at least one of the memory locations;

(c) determining whether the second processor's reservation indicator is set, this determination being in response to the second processor including the at least one of the cache memory locations corresponding with the at least one of the memory locations; and (d) providing a first state indicating that the at least one of the cache memory locations of the second processor corresponding with the at least one of the memory locations is invalid, responsive to the reservation indicator of the second processor not being set.

2. The method of claim 1, further comprising the step (c1) of invalidating the at least one of the cache memory locations of the second processor, responsive to the reservation indicator of the second processor not being set.

3. The method of claim 1, further comprising a step of providing a second state indicating that the first processor should wait if the second processor's reservation indicator is set.

4. The method of claim 3, wherein the second state is "shared".

5. The method of claim 3, further comprising a step of determining if a first data associated with the at least one of the memory locations has been modified.

6. The method of claim 5, further comprising a step of providing a response from the second processor.

7. The method of claim 6, further comprising a step of writing a second data associated with the at least one of the plurality of cache memory locations to the at least one of the memory locations, this writing step being in response to a first response from the second processor.

8. The method of claim 6, further comprising a step of forwarding the data associated with the at least one of the plurality of cache memory locations to the first processor, this forwarding step being in response to a second response from the second processor.

9. The method of claim 1, further comprising a step of determining if a first data associated with the at least one of the memory locations has been modified.

10. The method of claim 9, further comprising a step of determining if intervention is enabled if the second processor's reservation indicator is not set and if the first data has been modified.

11. The method of claim 9, further comprising a step of determining if a second state is "exclusive", this determination being in response to the second processor's reservation indicator not being set and the first data not having been modified.

12. The method of claim 1, further comprising the step of providing a response from the second processor.

13. The method of claim 12, further comprising the step of writing a second data associated with the at least one of the cache memory locations to the at least one of the memory locations, this writing step being in response to a first response from the second processor.

14. The method of claim 12, further comprising a step of forwarding the data associated with the at least one of the plurality of cache memory locations to the first processor, this forwarding step being in response to a second response from the second processor.

15. A system of accessing data in a multiprocessor system comprising:
   a memory including a plurality of memory locations;
   a first processor including a first reservation indicator and a first cache, wherein the first processor provides a Load And Reserve request for at least one of the plurality of memory locations; and
   a second processor including a second reservation indicator and a second cache, wherein the second cache has a plurality of cache memory locations, wherein a state is provided which indicates that at least one of the cache memory locations which corresponds to the at least one of the plurality of memory locations is invalid if the second reservation indicator is not set.

16. The system of claim 15, wherein the second processor invalidates the at least one of the cache memory locations if the second reservation indicator is not set.

17. The system of claim 15, wherein the second processor provides a state indicating that the first processor should wait if the second processor's reservation indicator is set.

18. The system of claim 17, wherein the state is "shared".

19. A computer readable medium containing program instructions for accessing data in a multiprocessor system including a plurality of processors and a memory, wherein the memory includes a plurality of memory locations, and wherein at least a first processor and a second processor each include a reservation indicator and a cache, each cache having a plurality of cache memory locations corresponding to the memory locations, the program instructions comprising the steps of:
   (a) providing a Load And Reserve request from the first processor for at least one of the plurality of memory locations;
   (b) determining whether the second processor includes at least one of the plurality of cache memory locations corresponding with the at least one of the memory locations;
   (c) determining whether the second processor's reservation indicator is set, this determination being in response to the second processor including the at least one of the cache memory locations corresponding with the at least one of the memory locations; and
   (d) providing a state indicating that the at least one of the cache memory locations of the second processor corresponding with the at least one of the memory locations is invalid, responsive to the reservation indicator of the second processor not being set.

20. The computer readable medium of claim 19, further comprising step (c1) of invalidating the at least one of the cache memory locations of the second processor, responsive to the reservation indicator of the second processor not being set.

21. The computer readable medium of claim 19, further comprising a step of providing a state indicating that the first processor should wait if the second processor's reservation indicator is set.

22. The method of claim 21, wherein the state is "shared".

23. A method for accessing data in a multiprocessor system, the multiprocessor system including a plurality of processors and a shared memory, wherein a plurality of cache memories are associated with the processors, the method comprising the steps of:
   requesting, by a first processor, access to information in the shared memory;
   receiving the request by a second processor, wherein the second processor includes a version of the information;
   invalidating the second processor's version of the information in response to the request, when the request comprises a predetermined signal; and
   granting exclusive authority to the first processor to write to a memory location; wherein the granting is in response to the request; and is independent of other requests received by the second processor.

24. The method of claim 23, wherein the multiprocessor system comprises an architected hierarchy among system devices; and, according to an architected communication protocol of the system, devices at different levels in the hierarchy may signal an atomic access using the predetermined signal; and wherein the first and second processors are at a same level in the hierarchy.

25. A method for accessing data in a multiprocessor system including a shared memory, a plurality processor cache memories, and a memory coherency protocol; the method comprising the steps of:
   issuing a request for access to shared memory by a first processor;
   receiving the request by a second processor;
   changing a coherency status for a memory location of a second processor's cache memory prior to the second processor receiving a second request from the first processor; and
   granting exclusive authority to the first processor to write to a memory location; wherein the granting is in response to the request; and is independent of other requests received by the second processor.

* * * * *